Figure 1:
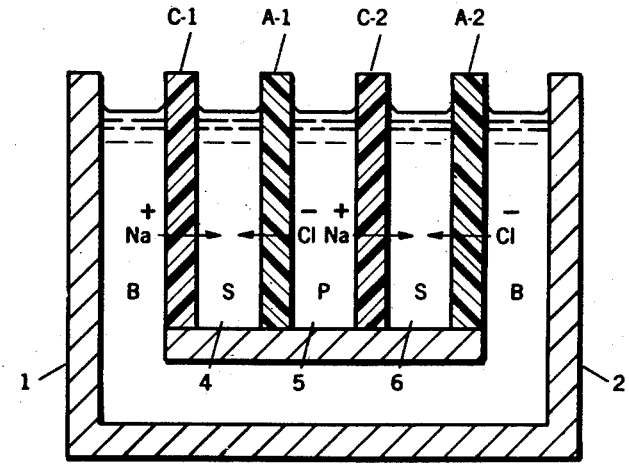

Aug. 2, 1960

G. W. MURPHY 2,947,688

PROCESS AND APPARATUS FOR THE DEMINERALIZATION OF SALINE WATER

Filed Jan. 10, 1957

4 Sheets-Sheet 1

LEGEND

= Cation permselective membrane

= Anion permselective membrane

= Inert and impervious material

Inventor

George W. Murphy

Inventor

George W. Murphy

Aug. 2, 1960

G. W. MURPHY 2,947,688

PROCESS AND APPARATUS FOR THE DEMINERALIZATION OF SALINE WATER

Filed Jan. 10, 1957

4 Sheets-Sheet 3

Inventor
George W. Murphy

Inventor
George W. Murphy

United States Patent Office 2,947,688
Patented Aug. 2, 1960

2,947,688
PROCESS AND APPARATUS FOR THE DEMINERALIZATION OF SALINE WATER
George W. Murphy, Norman, Okla., assignor to the United States of America as represented by the Secretary of the Interior
Filed Jan. 10, 1957, Ser. No. 634,138
8 Claims. (Cl. 210—23)

This invention herein described and claimed, may be manufactured and used by or for the Government of the United States of America, for governmental purposes without the payment of any royalties thereon or therefor.

This invention relates to the demineralization of saline waters employing a unique power source derived from a brine and a water of lower salinity, to effect migration of ions from one solution to another across ion permeable membranes.

There is a great need, at the present time, for an effective, economical process for preparing fresh water from saline waters, which include sea water, saline ground waters, prepared aqueous solutions or waste waters, resulting from commercial, industrial or residential activities. It has been proposed to demineralize saline waters by distillation, and by electrodialysis, both of which require external energy. Solar distillation has been proposed, but this requires expensive structures covering a large surface area.

It is an object of the present invention to provide a system for demineralizing saline waters without the use of any external source of energy.

A further object of the invention is to provide a method and means for demineralizing saline waters wherein the energy requirement is supplied by the free energy difference between concentrated brine and less concentrated saline water.

A further object of the invention is to provide a simple three-chamber cell having impervious sides and bottom, the chambers being formed by four ion-permselective membranes which are substantially impervious to water, and are alternately cation-permselective and anion-permselective, the chambers being filled with saline water and the cell as a whole being partly immersed in brine.

A further object of the invention is to provide an apparatus wherein a plurality of three chamber cells are linked together.

Another object of the invention is to provide a method for linking the two or more three chamber cells in series.

Another object is to provide a method for reducing the required area of the ion-permselective membranes by the use of additional chambers.

Other objects and features of the invention will be apparent from the following detailed description of the method and apparatus, and from consideration of the figures in the drawing.

The present invention in its simplest form, consists of a cell of three chambers having impervious sides and bottoms, formed by four spaced, ion-permeable membranes, which are alternately cation-permselective and anion-permselective, the cell being immeresd in a concentrated salt solution, e.g., sea water, or saline ground water. Owing to the selective ion migration across the ion-permeable membranes, which is induced by the osmotic force resulting from the concentration difference, the middle chamber becomes less saline (considering the use of brine and saline water), the two outer chambers become more saline, and the brine becomes more dilute. Blocks of chambers may be suitably arranged to form a single large cell, as will be more fully explained below. Two or more simple, three chamber cells may be arranged in series, so that the partially desalted water from one cell forms the feed water for the next cell. The over-all surface area of membrane required may be reduced by the inclusion of additional chambers containing saline water and brine.

Figure 2:
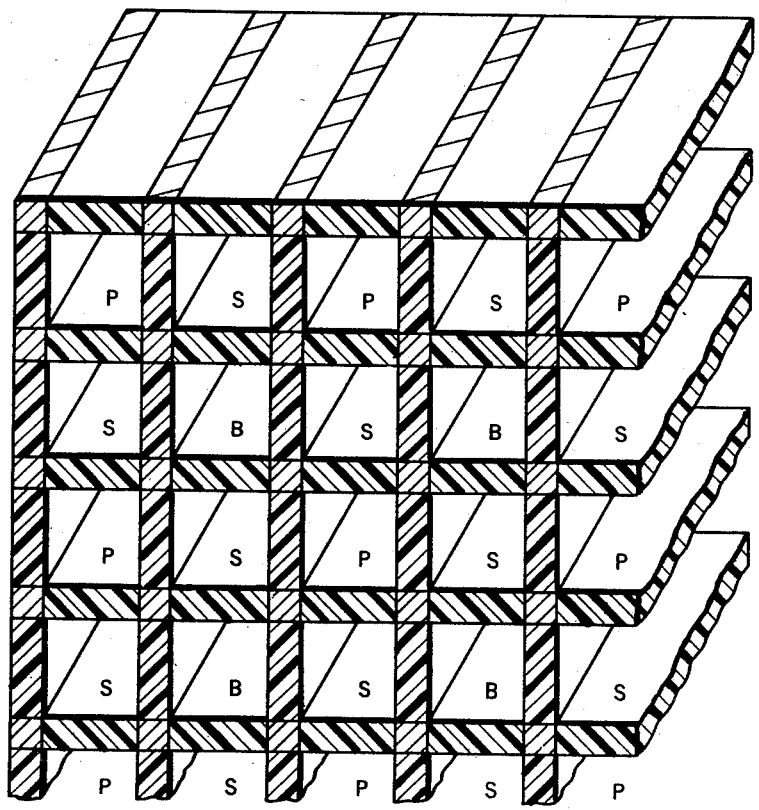
Figure 3:
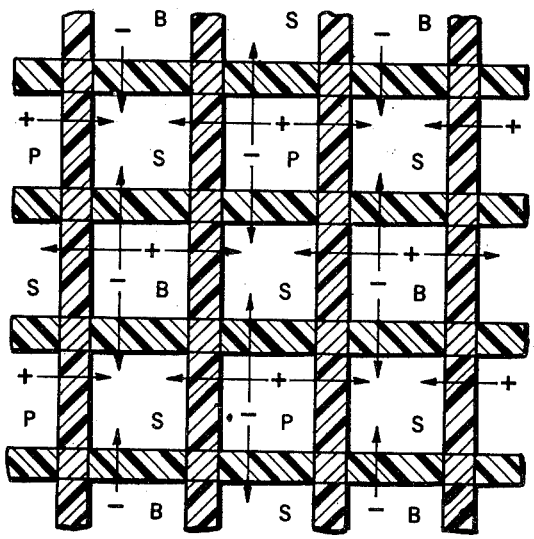
Figure 4:
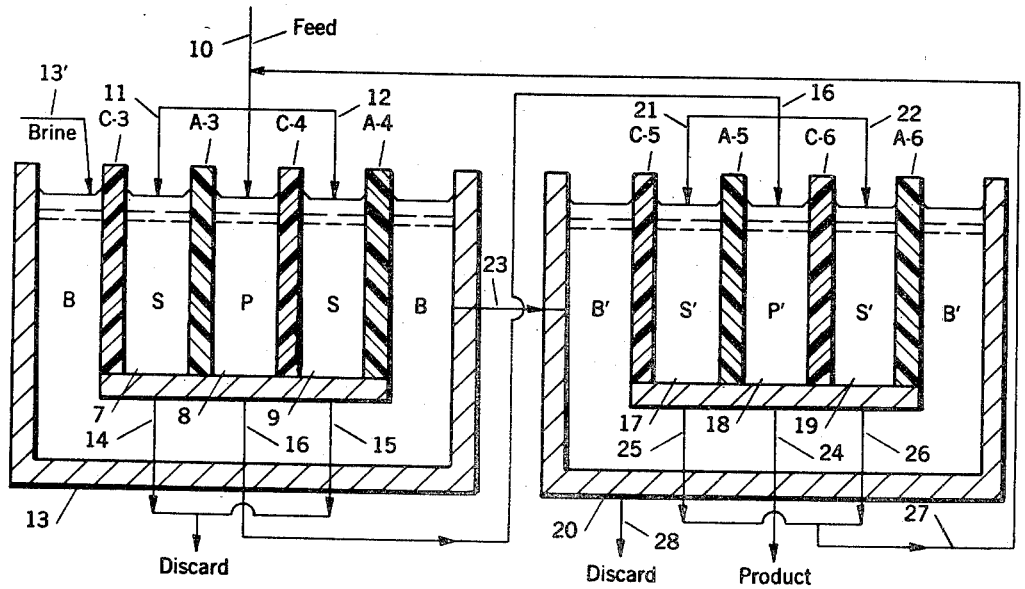
Figure 5:
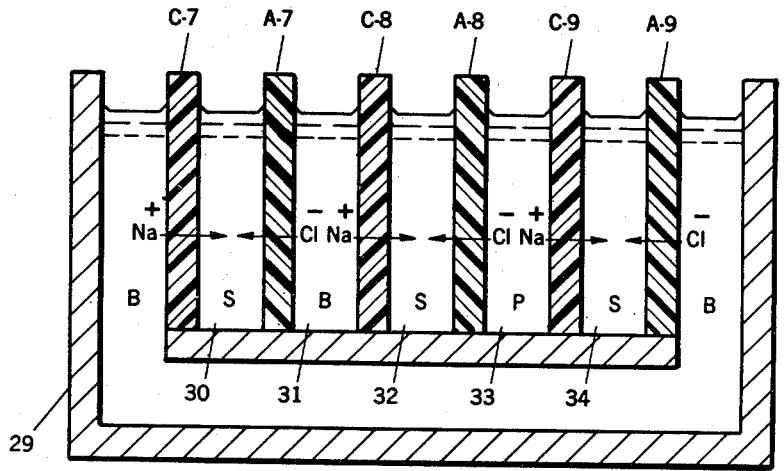
Figure 6:
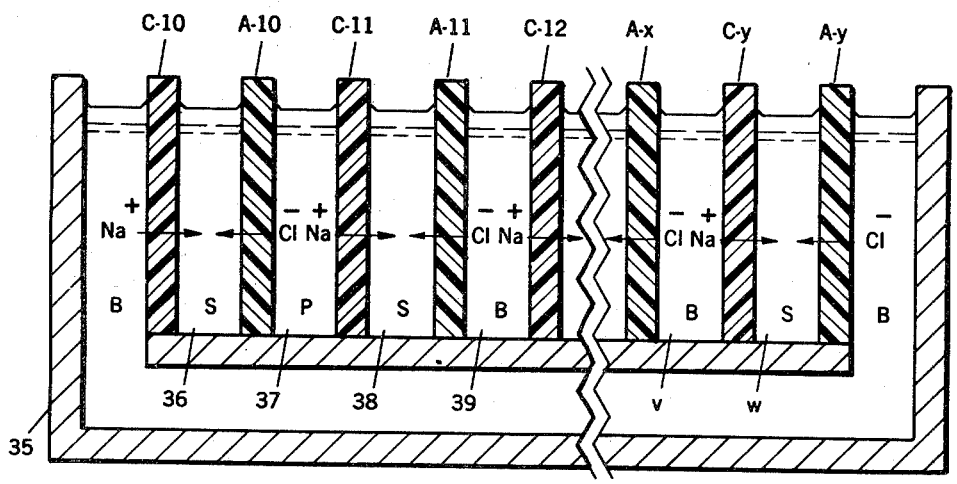

In the drawing:
Fig. 1 shows more or less diagrammatically a simple single effect cell in elevational cross section.
Fig. 2 shows an isometric view of a section of a multiple chamber single effect cell.
Fig. 3 is a fragmentary cross-sectional view of the cell of Fig. 2, showing the direction of ion movements.
Fig. 4 is a schematic flow diagram of a two-stage simple, single-effect system.
Fig. 5 is an elevational cross-section of a simple, double-effect cell.
Fig. 6 is an elevational cross-section of a simple multiple-effect cell.

In order to completely convert saline water of vapor pressure $p$ to pure water of vapor pressure $p^0$, a minimum amount of energy must be supplied, equal to the free energy difference—

$$\Delta G = RT \ln\left(\frac{p^0}{p}\right)$$

per mole between the pure water and the saline water. Up to now, mechanical, chemical, radiant, thermal and electrical energies have been utilized for the separation of pure water from saline solutions. Similarly, the difference in free energy between brine of vapor pressure $p'$ and saline water of vapor pressure $p$ is $$\Delta G = RT \ln\left(\frac{p'}{p}\right)$$

per mole. This free energy difference could be utilized to drive the salt out of saline water, if a suitable device were available. This type of power source may be referred to as osmotic.

The modification shown in Fig. 1 is one device for utilizing this osmotic power to remove salt.

In the drawings, B, S, and P represent brine, saline solution, and solution undergoing purification or demineralization, respectively; C and A are cation- and anion-permselective diaphragms, respectively, which are impervious, or substantially so, to water.

Referring to Figure 1, demineralizing cell 1 consists of tank 2, containing brine B, and chambers 4, 5 and 6 containing S, P and S respectively. The walls and bottom of tank 2 are made of an impervious material not affected by the solutions involved. In the case of sea water, glass, stainless steel, glazed tile, and the like would be suitable. Chambers 4, 5 and 6 have similar inert, impervious bottoms and sides as tank 2. At the ends of the chambers and separating them from each other and from B are ion-permselective membranes C–1, A–1, C–2 and A–2. C–1 is a cation permselective membrane and separates B in tank 2 from S in chamber 4; A–1 is an anion permselective membrane which separates S in chamber 4 from P in chamber 5; C–2 is a cation permselective membrane which separates P in chamber 5 from S in chamber 6, while A–2 is an anion-permselective membrane which separates B in tank 2 from S in chamber 6. Means, not shown, are provided for introducing and removing liquid from the tank and chambers.

Because of the osmotic force acting between the brine and saline water, sodium ions migrate from the brine B, passing through cation permselective membrane C–1 into chamber 4 and chloride ion similarly migrates from brine B through anion permselective membrane A–2 into chamber 6. Balancing this ion migration, chlorine and sodium ions migrate from P in chamber 5 through A–1 and C–2, respectively, into chambers 4 and 6. It is obvious therefore, that the saline solution becomes more concentrated in chambers 4 and 6, while the brine in tank 2 becomes less concentrated. By continuously flushing chambers 4 and 6 with fresh saline solution and tank 2 with brine, the concentrations may be maintained substantially constant. The concentration of salt in P will then reach an equilibrium value which depends on a number of factors, among them being the chemical nature of the permselective membrane, its permeability and area, concentration of solutions, temperature, and pressure.

The P and S chambers may be combined with B chambers to form a large cell as shown in Fig. 2. In this modification relatively dilute and concentrated salt solution are led into the S and B chambers, respectively. Demineralized water is removed from the P chambers. The ion migrations (the ions are here shown generically by their charge) across the anion and cation-permselective membranes are shown in the enlarged cross-sectional view of Fig. 3. The positive ions in P migrate across the cation-permselective membrane into the laterally adjacent S chambers, while the negative ions migrate across the anion-permselective membrane to the vertically adjacent S chambers. In a similar manner, positive ions in B migrate across the cation-permselective membrane to the laterally adjacent S chambers, while the negative ions in B migrate across the anion-permselective membrane to the vertically adjacent S chambers. The B chambers may be interconnected.

A two-stage operation is illustrated by the schematic flow diagram of Fig. 4. This modification will be discussed in connection with saline solution and brine, but it is to be understood that other mineralized waters may be employed.

Here, saline feed water is fed into chambers 7, 8 and 9 via line 10, 11 and 12, respectively. Brine is led into tank 13 via line 13'. As in the modification of Fig. 1, the tank 13 is made of any suitable inert and impervious material, as are the chambers except for the membranes C-3, A-3, C-4 and A-4. Due to ion migration, as explained in connection with Fig. 1, the P solution in chamber 8 becomes relatively demineralized while the S solution in 7 and 9 becomes more concentrated, and at the same time the brine B in tank 13 becomes more dilute. The S solutions are removed from chambers 7 and 9 via lines 14 and 15 and may be discarded, or concentrated to make brine. Relatively demineralized P solution is removed from chamber 8 via line 16 to form the feed for the second stage. Here chambers 17, 18 and 19, similar to chambers 7, 8 and 9, and separated by membranes C-5, A-5, C-6 and A-6, are located in tank 20. Relative demineralized P solution from chamber 8 is introduced into chambers 17, 18 and 19 via lines 16, 21 and 22 to form S' and P' solutions similar to S and P. Brine from tank 13 is supplied to tank 20 via line 23, and forms the brine solution B' for the second stage. The demineralized water is removed from chamber 18 through line 24. The S' solution which is more saline than the P solution led into chambers 17 and 19, is recycled back to the feed by means of lines 25, 26 and 27. Brine B' is withdrawn through line 28. This brine may be discharged from the system as waste or, if desired, may be concentrated or otherwise processed for further use in the system or elsewhere.

By using additional pairs of anion and cation permselective membranes, it is possible to multiply the osmotic driving force, thereby increasing the ultimate rate of demineralization. Fig. 5 shows modification of the cell of Fig. 1 by the addition of one membrane pair to the simple cell of Fig. 1. An additional chamber encloses brine which is isolated from the outside supply, and this results in doubling the driving force produced. Therefore, for the same degree of demineralization, a smaller membrane area is required. In Fig. 5, 29 is the tank corresponding to 2 of Fig. 1. The individual chambers 30 to 34 are separated from each other by membranes C-7, A-7, C-8, A-8, C-9 and A-9. As compared to the cell in Fig. 1, there is an additional S chamber 30, separated from chamber 32 by isolated brine containing chamber 31. The migration of ions is shown in Fig. 5 by the arrows, and is similar to that of Fig. 1.

Fig. 6 shows a cell similar to that of Fig. 5 having a plurality of membrane pairs added to the simple, basic cell of Fig. 1. Ion migration in the salt solutions is indicated by arrows. A-10, A-11, C-10 to C-12 and A-$x$, C-$y$ and A-$y$ are the anion and cation permselective membranes, 35 is the tank and 36 to 39$v$ and $w$ are a plurality of chambers as in Figs. 1 and 5. The broken, jagged lines indicate that the S and isolated B chambers are repeated. The effect of the chambers containing isolated brine is similar to that in Fig. 5, but the presence of more than one cell serves to further multiply the effect.

Although Figs. 1, 2, 4, 5 and 6 have been described in connection with solutions of sodium chloride, solutions of other salts and mixtures of salts may be employed. Nor do the S and B solutions have to be the same. The osmotic driving force depends only on the concentration difference of ions across the membranes separating the relatively dilute from the concentrated saline solution and is substantially independent of their specific nature. Thus, potassium or magnesium cations, for example, function like sodium, and bromide or sulfate anions function like chloride. The specific nature of the ions will, however, affect the rate of demineralization, since ions in general have different mobilities.

Precipitate may form with certain combinations of ions. For example, silver ions and chlorine ions entering into a chamber through ion-permselective membranes will yield a precipitate. A similar result would occur with other well known combinations of ions. Such precipitation, unless it occurs on or in the membranes, does not affect the operation to any significant degree. Any deposits of precipitates may be removed from the cells from time to time.

If desired, the cells may be tubular instead of rectangular. In this form, the tubes would be arranged concentrically so as to provide a central tube containing brine, and three annular chambers, respectively S, P, and S. This assembly is surrounded by brine which is connected to the central tube. As in the rectangular form, the walls of the chambers are alternately anion and cation permselective. The desalted water is removed from the P chamber or annulus between the second and third tubes.

Still another form, not illustrated, which may be employed, consists of a cell formed by three adjacent chambers separated by alternate anion and cation permselective membranes, the middle P chamber having the cross-sectional shape of a double-convex lens, the two neighboring S chambers being concavo-convex in cross-section, the chambers coming together at the top and bottom. As in the other embodiments, the cell is immersed in brine and demineralized water is removed from the P chamber.

My invention is not dependent upon specific permselective membranes. In actual practice, it is only necessary that the membranes be more than 50% permeable to the cation or anion, and that they be impervious, or only slightly pervious to water.

There are many anion and cation permselective membranes known to the art which may be employed in my process. Examples of satisfactory membranes are described in U.S. Patents 2,636,851; 2,636,852; 2,681,319; 2,681,320; 2,702,272; 2,731,408; 2,731,411; 2,731,425; 2,731,426; 2,741,591 and 2,741,595.

I have found that the permselective membranes "Amberplex A-1" and "Amberplex C-1," which are respectively anion and cation permselective membranes manufactured by the Rohm & Haas Company of Philadelphia, Pennsylvania, and disclosed in U.S. Patents 2,681,319 and 2,681,320, are particularly suitable for the practice of my invention.

As indicated, the more dilute salt solution S may be saline ground water or sea water while the concentrated salt solution B may be brine obtained by solar evaporation of sea water, or from naturally occurring brines, for example, the Great Salt Lake or Dead Sea.

The following example shows the operation of a simple, single effect cell, such as shown by Fig. 1.

Ion transfer chambers were prepared by bolting together five rectangular Monel metal frames about 2" x 4" and ¼ inch thickness, having alternate anion and cation exchange membranes between each frame and the ends open to form three chambers, similar to the cell shown in Fig. 1. Each membrane has an open area of 1" x 3½". Provision was made for solution entry into each chamber. The membranes employed were "Amberplex A-1" and "Amberplex C-1."

During a run the assembly was immersed in a stirred brine bath. Temperature was not controlled, but sharp temperature fluctuations were avoided by suitable insulation.

Sodium chloride solution for the first and third chambers (corresponding to S in Fig. 1) was introduced at the bottom of the chambers and the effluent was removed from the top of these chambers. A flow rate of from 250–1000 ml. per hour was maintained through both chambers so that concentration could be kept constant. The initial concentration in the middle chamber (corresponding to P in Fig. 1) was the same as in the first and third chambers. The pressure on the liquids in the several chambers was substantially equal.

During a run, solution from the middle chamber was drawn into a resistance cell, and the resistance determined by means of a resistance bridge. For control purposes the resistance of effluent from the end chambers was also taken immediately thereafter.

The equilibrium conductance ratios $$\frac{L_0}{L_\infty}$$

are given in Table I for three representative experiments, where $L_0$ is the initial conductance, and $L_\infty$ the conductance at equilibrium. The ratio of the conductance, $L$, at various times to $L_0$ for the same experiments is given in Table II.

TABLE I

*Equilibrium conductance ratio for three demineralization runs*

| Run | Bath Solution | Initial Salt Concentration in P and S Chambers, moles/liter | Equilibrium Conductance Ratio, $L_0/L_\infty$ |
| --- | --- | --- | --- |
| A-1 | sat. brine | 0.6 | 1.16 |
| A-4 | 0.2 M | 0.02 | 2.37 |
| A-6 | sat. brine | 0.02 | 9.20 |

TABLE II

*Conductance ratio as a function of time*

| Run A-1 | | Run A-4 | | Run A-6 | |
| --- | --- | --- | --- | --- | --- |
| Time (hrs.) | $L_0/L$ | Time (hrs.) | $L_0/L$ | Time (hrs.) | $L_0/L$ |
| 0 | 1.00 | 0 | 1 | 0 | 1 |
| 17.00 | 1.06 | 1.42 | 1.16 | 1.08 | 1.62 |
| 22.75 | 1.08 | 2.42 | 1.30 | 2.17 | 3.00 |
| 26.58 | 1.09 | 3.67 | 1.48 | 4.17 | 5.83 |
| 30.25 | 1.12 | 4.50 | 1.54 | 8.00 | 11.30 |
| 41.58 | 1.14 | 5.67 | 1.66 | 20.08 | 10.00 |
| 53.58 | 1.16 | 8.83 | 2.10 | 20.17 | 9.23 |
| 59.75 | 1.16 | 21.33 | 2.38 | 29.50 | 9.18 |
| | | 26.42 | 2.37 | 44.00 | 9.05 |

The low equilibrium value for run A-1, showing a 15% reduction in salinity, indicates low selectivity of the membranes employed in concentrated solutions. However, a multistage process such as shown in Fig. 4 can be employed to bring the salt content in a highly salinated water such as sea water down to any desired level. On the other hand, the results of runs A-4 and A-6 indicate that a brackish water can be demineralized in a single pass.

It is to be understood that the above description, together with the specific examples and embodiments described, is intended merely to illustrate the invention, and that the invention is not limited thereto, nor in any way except by the appended claims.

I claim:

1. A cell for separating salts from aqueous solutions which comprises a series of three contiguous chambers, separated from each other, and closed off by a series of four alternately spaced anion and cation permselective membranes, the middle chamber called herein P and the end chambers S, said S chambers being in contact with chamber means called herein B, and separated therefrom by the two end ion permselective membranes of said series of four, said P and S chambers containing relatively dilute and said B chamber containing relatively concentrated saline solutions, means for introducing relatively concentrated saline solution into B, means for introducing relatively dilute saline solution into the P and S chambers, means for removing saline solution of increased concentration from the S chambers, means for removing saline solution of diminished concentration from the B chamber means, and means for removing relatively deionized water from the P chamber.

2. A cell for demineralizing salt-containing water which comprises a container having a relatively concentrated salt solution, a series of adjacent chambers located in said container and immersed in said salt solution, said chambers being $3+2n$ in number where $n$ is selected from zero and the series of positive integers, the chambers being separated from each other by ion permselective membranes, said membranes being positioned alternatively cation and anion permselective, means for introducing relatively dilute salt solution into three contiguous chambers of said series, means for introducing into the remaining chambers, if any, relatively concentrated and relatively dilute salt solutions respectively, so that said remaining chambers are spaced to contain alternately relatively concentrated and relatively dilute salt solution, only three contiguous chambers in which relatively dilute salt solution is introduced being present, means for withdrawing relatively demineralized water from the middle chamber of said contiguous chambers and means for withdrawing salt solutions from the remaining chambers.

3. A cell for demineralizing salt-containing waters which comprises, a plurality of chambers arranged linearly and separated from each other by alternately spaced anion and cation-permselective membranes, comprising a set of three contiguous chambers having two end chambers, herein called S, and one middle chamber, herein called P, any further chambers other than said contiguous set of three being arranged in couplets, one chamber of which is called herein $S_1$ and the other chamber $B_1$, the first couplet being placed in juxtaposition with an S chamber so that $B_1$ is adjacent an S chamber, and in any succeeding couplets $B_1$ is adjacent $S_1$, a chamber called herein B in contact with the terminal S, and if present, $S_1$ chambers of the above linear series of chambers, said S, S, and P chambers containing relatively dilute saline solution, said B and $B_1$ chambers containing relatively concentrated saline solution, means for introducing relatively dilute saline solution into the S, P and $S_1$ chambers, means for introducing concentrated saline solution into said B and $B_1$ chambers, means for removing relatively desalted solution from P as a product, and means for removing solution from S, $S_1$, B and $B_1$.

4. An apparatus for demineralizing saline solutions which comprises, a plurality of four sided elongated adjacent chambers, said chambers having two anion and two cation permselective membranes as sides, the membranes serving to separate the chambers from each other, said chambers being arranged in a plurality of rows and columns to form a cell, means for continuously charging a first series of alternate rows, starting with the first row, with relatively dilute salt solution, means for continuously charging alternate chambers in a second series of alternate rows starting with the second row with relatively concentrated and relatively dilute salt solution respectively, means for removing demineralized water from alternate chambers in the first series of alternate rows, means for removing saline solutions from the chambers in the second series of alternate rows, and from the remaining chambers in the first series of alternate rows.

5. An apparatus for demineralizing salt-containing waters which comprises a series of three contiguous chambers separated from each other and closed off by four alternately spaced anion and cation permselective membranes, the middle chamber called herein P and the end chambers called S, said S chambers being in contact with chamber means called herein B, said P and S chambers containing relatively dilute saline solution and said B chamber means containing relatively concentrated saline solution, a second series of chambers similar to P, S and B, called herein P', S' and B', means for introducing concentrated saline solution in B, means for introducing relatively dilute saline solution into P and the S chambers, means for removing a relatively concentrated saline solution from the S chambers, means for removing relatively desalted water from P and introducing it as feed water to P' and the S' chambers, means for removing saline solution of lower concentration from B and introducing it into B', means for removing saline solution from the S' chambers and introducing said solution along with fresh feed into the P and S chambers, means for removing a less concentrated saline solution from B' and means for removing demineralized water from P'.

6. In a method for demineralizing relatively dilute saline waters including sea waters, the steps comprising: introducing relatively dilute saline water into each of three adjacent zones, the end zones called herein S zones, and the middle zone called herein a P zone, said zones being separated from each other and closed off by alternate anion and cation permselective membranes, the S zones being separated by ion-permeable membranes from a B zone, introducing concentrated salt solution into said B zone, so that cations and anions migrate out of the B and P zones into the S zones, and recovering relatively desalted water from zone P.

7. In a method for demineralizing relatively dilute saline waters, including sea water, the steps comprising: introducing relatively dilute saline water into at least one series of three adjacent zones, constituting a first row, each series having a middle zone, called herein P, and two end zones called herein S, at least one second series of three adjacent zones, constituting a second row which is adjacent the said first row, each of said second series having a middle zone, called herein $S_1$ and into which relatively dilute saline water is introduced and two end zones called herein B and into which relatively concentrated saline water is introduced, the zones being in a face-to-face relationship with each other in the same series and with those in the adjacent row, so that the arrangement of the first series in the first two rows is $$\begin{array}{ccc} S & P & S \\ B & S_1 & B \end{array}$$

repeating the number of rows $n$ times, where $n$ is selected from zero and the group of positive integers, each of said zones having both anion and cation permselective membranes serving as boundaries to separate each zone from its neighbors, so that anions and cations migrate out of P and B into adjacent S and $S_1$; thereby substantially demineralizing the solution in P and increasing the saline concentration in S and $S_1$ and decreasing the saline concentration in B, and removing substantially demineralized water from P.

8. The method of claim 6 wherein the relatively desalted water from zone P is conducted as feed water to a second series of three zones called herein $S_1$ and $P_1$ which are substantially the same as S and P, removing the somewhat desalted water from B and conducting it to zone $B_1$, which is substantially the same as B and which is in contact with the end zones $S_1$, removing solution from the $S_1$ zones and recycling said solution to the feed for the S and P zones, removing demineralized water from $P_1$ as the product of the process, removing solution from S and $B_1$ as discard.

References Cited in the file of this patent
UNITED STATES PATENTS

| 2,694,680 | Katz et al. | Nov. 16, 1954 |
| 2,796,395 | Roberts | June 18, 1957 |

FOREIGN PATENTS

| 746,609 | Great Britain | Mar. 14, 1956 |

OTHER REFERENCES

Saline Water Conversion Annual Report of the Secretary of the Interior for 1955. Published by Department of the Interior January 3, 1956; pages 43–45 relied upon.